March 14, 1944.  H. KÜPPENBENDER ET AL  2,344,409
PHOTOGRAPHIC CAMERA
Filed June 15, 1940
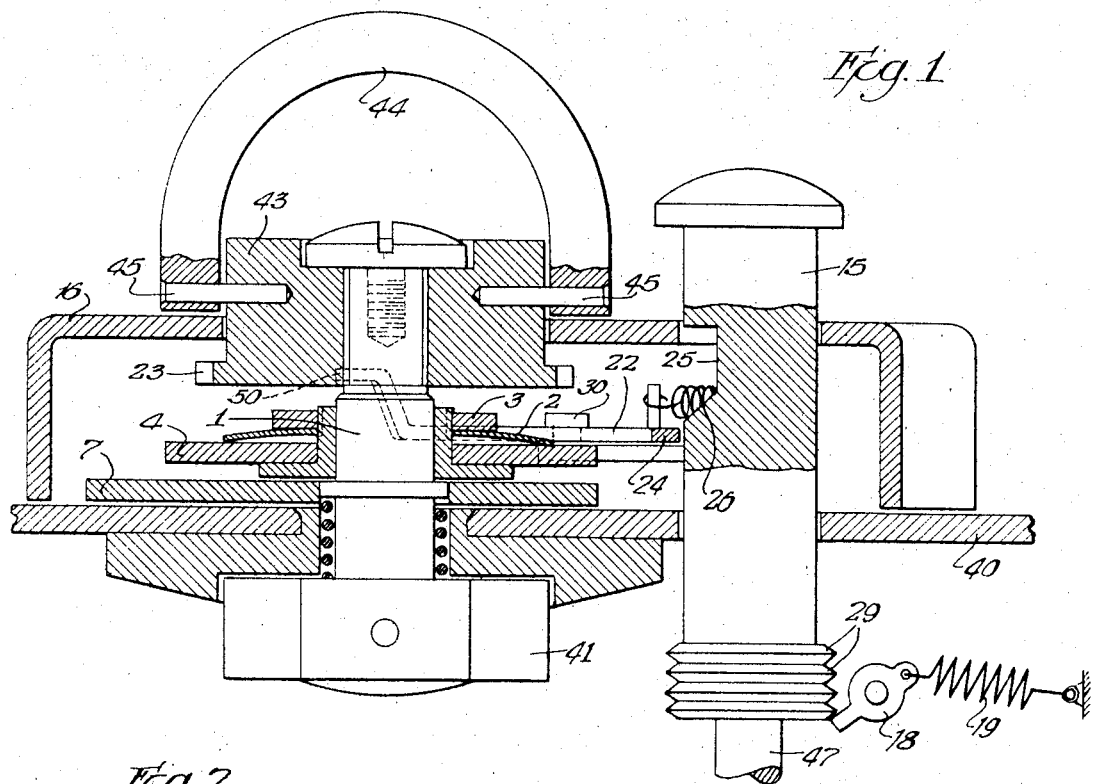
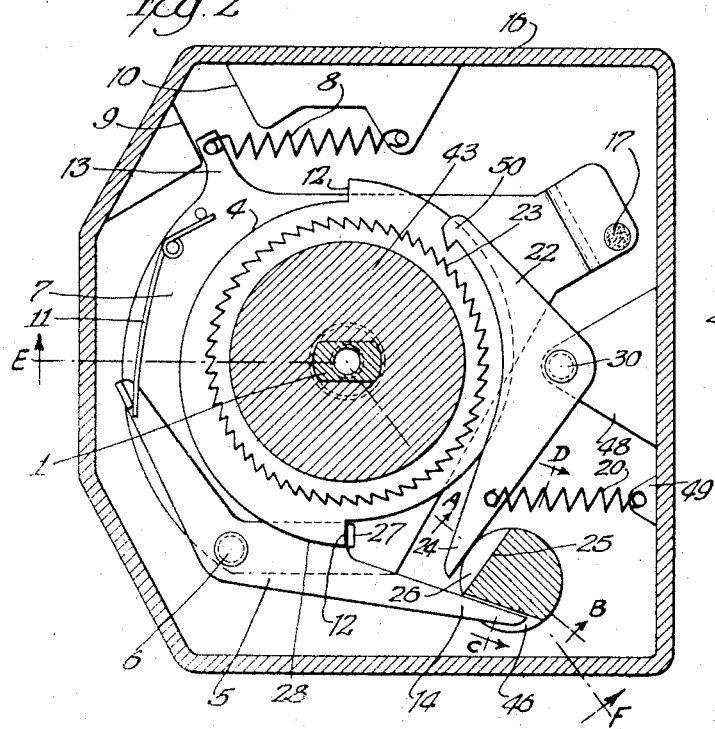
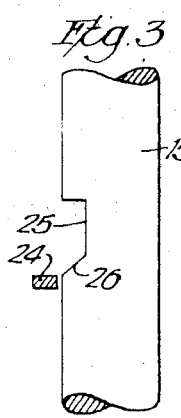
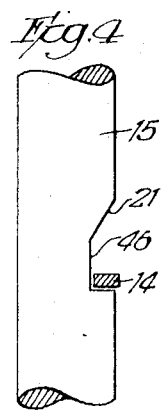
Inventors:
Heinz Küppenbender
Heinrich Eyth
Eugen Jorg Patented Mar. 14, 1944

2,344,409

UNITED STATES PATENT OFFICE 2,344,409

PHOTOGRAPHIC CAMERA

Heinz Küppenbender, Dresden, Heinrich Eyth, Stuttgart-Sonnenberg, and Eugen Jörg, Stuttgart, Germany; vested in the Alien Property Custodian Application June 15, 1940, Serial No. 340,750
In Germany June 15, 1939

5 Claims. (Cl. 95—31)

This invention relates to improvements in photographic cameras, and particularly to safeguards against improper manipulation of the same.

It is an object of the invention to provide a roll film camera in which a trip for the shutter must be operated to a predetermined extent, before the next exposure of a portion of the film can be made.

It is also an object of the invention to provide a roll film camera with which the operator cannot advance the film for the next exposure, until the shutter actuating mechanism has been restored to fully operative position.

Another object of the invention is to provide a camera of this character in which the shutter trip mechanism when it is moved from its inoperative position to actuate the shutter is prevented from return movement to such inoperative position until it has completed its shutter actuating stroke.

The invention also has the object of providing a camera in which the presentation of a film in exposure location is indicated in a readily observable way to the operator, and in which through proper operation of the shutter mechanism the indication is caused to disappear, while upon improper or incomplete operation of the same mechanism the indication remains visible, to disappear solely when the shutter mechanism has been operated completely and properly.

An important object of the invention is to provide a camera of the character described in which the operator is prevented from advancing the film unless the shutter release mechanism is fully restored to that position from which it may be moved for effecting a successful exposure.

With these and numerous other objects in view an embodiment of the invention is described in the following specification and shown in the accompanying drawing to which the specification refers.

In the drawing:

Fig. 1 is partly a section on line E—F of Fig. 2, and partly an elevation of the parts in the position of rest;

Fig. 2 is a horizontal section of the device;

Figs. 3 and 4 are sectional views on the lines A—B and C—D respectively of Fig. 2.

In roll film cameras, it has been proposed heretofore to provide an interlocking device between the film feed mechanism and the shutter tensioning mechanism. This interlocking device released the film feed mechanism for actuation solely by application of tension to the shutter, and vice versa. Some of these cameras also were equipped with indicator elements operable by the film feeding mechanism. After having operated the manually actuated film feeding mechanism the operator was able to observe from the indicator in these cameras whether the film has actually been fed or not. The indicator in these cameras was associated with the shutter tripping mechanism in such manner that the indicator disappeared from view upon the shutter having been tripped.

The interlocking device, film feed, shutter release and indicator in this type of cameras must be accurately timed and adjusted relatively to each other to provide a reliable safeguard against double exposure. This means that upon initiation of the shutter release by operating a trip element, the interlocking device for the trip element must be operated simultaneously with the actuation of the shutter release element which is usually mounted on the lens board. This construction calls for a relatively expensive and laborious assembly of elements.

With the objects in view, as stated above, in the present invention the release structure for the shutter has one or more elements associated with a lock in such cooperation with its associated element that the latter remains operative until the sequence of functions initiated by actuation of a manual tripping member has been completed. This locking device assuring operativeness of the release structure for the entire series of functions, it is then immaterial whether the shutter is released before the indicator is freed, or whether the indicator is freed shortly before the shutter is operated.

In this manner the accurate mechanical adjustment of the parts, necessitated by their timing in proper sequence, may be dispensed with, and the entire structure can be produced far more economically than heretofore.

At the same time the invention provides a locking means for the film feed mechanism, which locking means remains effective over the entire period consumed by the sequence of functions associated with the release of the shutter. This means that the manual grip or key for feeding the film can be operated solely when the shutter trip is in its normal position of rest. As soon as this trip element has begun to become operative and until it returns to its position of rest, the film feed mechanism remains locked. It is immaterial whether the return be delayed by lack of attention on the part of the operator or by improper operation of the shutter trip element; the film feeding mechanism cannot be operated in the intervening period.

The camera casing indicated by the wall 40 supports rotatably the shaft 1 projecting from the casing and carrying in its interior the film clutch 41 for engagement with the take-up spool (not shown), while the other end of the shaft 1 has fixed thereto the hub 43. A key or handle 44 is pivotally mounted by pins 45 to the hub for rotatably actuating the shaft 1 and clutch 41. The key may be turned about the pins 45 into a plane approximately at right angle to the axis of shaft 1. This film feed actuator assembly is well known.

The short shaft 1 is connected through a friction clutch comprising elements 2 and 3 with a disc 4 having two teeth 12, Fig. 2. The toothed disc 4 cooperates with a lever 5 which is pivotally mounted on a pin 6 that is secured to a carrier plate 7. The carrier plate 7, which is journalled on the shaft 1, is controlled by a spring 8 which has a tendency to rock said plate in clockwise direction, Fig. 2, the rocking movement being limited by fixed stops 9 and 10. The lever 5 is under control of a spring 11 which has a tendency to move said lever counterclockwise about its pivot 6.

Whenever the key 44 is rotated counterclockwise, Fig. 2, one of the teeth 12 on disc 4 into whose path lever 5 is projected will impart a movement counterclockwise to pin 6 and lever 5. The carrier plate 7 will thereby be rocked until a finger 13 thereon engages the fixed stop 9 while tensioning the spring 8. In this position the assembly of elements 4, 5 and 7 is stopped against further movement.

The key 44 for the film feeding actuator, however, may be further rotated overcoming the friction of the clutch elements 2 and 3 until the desired length of film has been fed to exposure position.

During the movement of the toothed disc 4, entailing a short counterclockwise movement of the lever 5, the nose 14 of the lever 5 enters a recess or notch 46 of a trip member 15 for the shutter release mechanism, (Fig. 4).

The shutter release mechanism may be of any desired construction. The release mechanism here represented by the part 47 is actuated manually by pressure on the trip member 15.

In the position of the carrier plate 7, as shown, an indicator disk 17 carried by the plate 7 is visible through a suitably disposed opening, not shown, in the cover 16 which serves as a housing for the film feed actuator of the camera.

When the shutter is being tripped, by depression of the stem 15, a mechanism enters into action which compels the shutter release mechanism 47 to complete its full cycle of operation, before the next effective operation of the shutter release mechanism can occur. This mechanism comprises a series of circumferential teeth 29 on the shutter trip member 15, a pawl 18 mounted for engagement with said circumferential teeth, and a spring 19 acting on the pawl. This pawl prevents the trip member 15 after it has been partly depressed, from returning to its elevated position, since the pawl in any intermediate position is in locking engagement with the teeth 29 and solely permits the return of the member 15 to its normal position, as shown, when the entire series of circumferential teeth 29 has passed beyond the tip of the locking pawl 18.

If the shutter trip member 15 should have been actuated part way only, failing to operate the shutter release, the trip member cannot be restored to initial position until it has been fully depressed and thereby caused full operation of the shutter release.

During this release of the shutter, the lever 5 also is moved from the position shown in Fig. 4, this movement of the lever 5 out of the notch 46 being induced by a slanting cam surface 21 of the notch 46 which in the downward movement of the shutter trip member 15 pushes the nose 14 of lever 5 radially outward from the notch.

The spring 8 acting on the indicator carrier 7 assists in this movement of the lever 5 radially outwardly from the notch 46, as this indicator carrier 7 continuously is constrained to move in clockwise direction by the spring 8. The pivot pin 6 for lever 5 is also constrained in this direction to facilitate the withdrawal of the nose 14 from the notch 46. The indicator carrier plate 7, therefore, is moved clockwise by the spring 8 until the finger 13 of said plate enters into engagement with the stop 10. Owing to the rocking movement of plate 7 from one terminal position to the other terminal position, the indicator disc 17 disappears from that position in which it can be observed through the opening (not shown) in the cover 16.

When the hook 27 on lever 5 is moved radially outward from the tooth 12 of disk 4, it remains in sliding engagement with the edge 28 of disc 4 during the next actuation of the disk.

During the trip movement of the shutter release member 15, a second lever 22 enters a notch 25 in the member 15. The bell crank lever 22 is adapted to be rocked about a pin 30 fixed in bracket 48 and is constrained by a spring 20 to move with its nose 24 into the notch 25. The spring 20 is secured at one end to a fixed point 49 of the camera and is anchored at the other end to the bell crank lever 22 adjacent its nose 24. The opposite end of the bell crank 22 is provided with a hook 50 adapted for holding engagement with a ratchet 23 fixedly connected with the film feed actuator part 43. Owing to this engagement of the hook 50 with the film feed ratchet 23, any further operative movement of said ratchet is prevented during operation of the shutter release mechanism, a part of which is indicated at 47. Upon return of the shutter trip member 15 to its raised position, the cam surface 26 of notch 25 returns the nose 24 of the bell crank lever 22 to the position shown in Fig. 2, thereby also swinging the hook 50 of said bell crank lever to release position with respect to the ratchet 23, so that the next film feed actuation may take place whenever desired.

Instead of mounting the safety mechanism comprising the circumferential teeth 29 and the dog 18 to act on the shutter trip member 15, this safety device may also be disposed on any one of the elements, interposed between member 15 and the shutter lever, not shown. The plate 7 does not necessarily have to support directly the indicator mark 17, but a connecting structure may be interposed between the plate and the indicator disk in such manner as to induce movement of the indicator mark whenever the plate is actuated. This indirect connection may become necessary whenever the space underneath the cover 16 is too small to permit the indicator extension to be joined to the plate 7 in the manner shown in Fig. 2.

Furthermore, the nose 14 on lever 5 and the nose 24 on the bell crank lever 22, which parts are adapted for cooperation with the notches 46 and 25, respectively, in the shutter trip member 15, may be constructed as separate parts adapted to be actuated by the levers 5 and 22 respectively. Finally, it also is feasible to mount the circular toothed disc 4 as well as the indicator plate 7 in non-coaxial relation to the film winding axis and to operate these elements through intermediate gears or other transmission parts from the film winding stem 1.

We claim:

1. In a rollfilm camera, the combination of a shutter release means provided with a manually depressible member, a manually operable film advancing means provided with a ratchet, a rotatably mounted indicator carrying plate adapted to be rotated by said film advancing means to a position which indicates that an unexposed film section has been advanced to exposure position, a pawl rotatably mounted on said carrying plate and normally operatively connected with said film advancing means, said pawl being moved out of operative engagement with said film advancing means by said manually depressible member when the latter is depressed to release the shutter, spring means for moving said carrying plate out of its indicating position when said pawl has been actuated by said manually depressible member, a spring influenced holding pawl normally held out of engagement with said ratchet by said manually depressible member and engaging said ratchet to prevent an operation of said film advancing means when said depressible member is depressed, and means for preventing a return of said manually depressible member to its initial position and a release of said holding pawl from said ratchet when said depressible member is insufficiently depressed to cause a release of the shutter.

2. In a rollfilm camera, the combination of a camera casing, a shutter release means provided with a manually depressible stem mounted slidably in said casing, a manually rotatable film advancing means including a shaft and a ratchet fixedly secured thereto, a rotatably mounted indicator carrying plate adapted to be rotated by said film advancing means to a position which indicates that an unexposed film section has been advanced to exposure position, a pawl rotatably mounted on said carrying plate and normally operatively connected with said film advancing means, said pawl being moved out of operative engagement with said film advancing means by said manually depressible stem when the latter is depressed to release the shutter, spring means for moving said carrying plate out of its indicating position when said pawl has been actuated by said manually depressible stem, a spring influenced holding pawl pivotally supported within said casing and normally held out of engagement with said ratchet by said manually depressible stem and engaging said ratchet to prevent an operation of said film advancing means when said depressible stem is depressed, and means for preventing a return of said manually depressible stem to its initial position and a release of said holding pawl from said ratchet when said depressible stem is insufficiently depressed to cause a release of the shutter.

3. In a rollfilm camera, the combination of a camera casing, a shutter release means provided with a manually depressible stem mounted slidably in said casing, a manually rotatable film advancing means including a shaft and a ratchet fixedly secured thereto, a rotatably mounted indicator carrying plate adapted to be rotated by said film advancing means to a position which indicates that an unexposed film section has been advanced to exposure position, a pawl rotatably mounted on said carrying plate and normally operatively connected with said film advancing means, said pawl being moved out of operative engagement with said film advancing means by said manually depressible stem when the latter is depressed to release the shutter, spring means for moving said carrying plate out of its indicating position when said pawl has been actuated by said manually depressible stem, a spring influenced holding pawl pivotally supported within said casing and normally held out of engagement with said ratchet by said manually depressible stem and engaging said ratchet to prevent an operation of said film advancing means when said depressible stem is depressed, and means for preventing a return of said manually depressible stem to its initial position and a release of said holding pawl from said ratchet when said depressible stem is insufficiently depressed to cause a release of the shutter, said means including a spring-actuated locking pawl pivotally mounted in said casing and cooperating with a series of teeth on said depressible stem to permit a return of the latter only after the entire series of teeth has been moved past said locking pawl.

4. In a rollfilm camera, the combination of a camera casing, a shutter release means provided with a manually depressible stem mounted slidably in said casing, a manually rotatable film advancing means including a shaft and a ratchet fixedly secured thereto, an indicator carrying plate rotatably mounted on said shaft and adapted to be rotated with the latter until the indicator on said plate reaches a position which indicates that an unexposed film section has been advanced to exposure position, a pawl rotatably mounted on said carrying plate and normally operatively connected with said film advancing means, said pawl being moved out of operative engagement with said film advancing means by said manually depressible stem when the latter is depressed to release the shutter, spring means for moving said carrying plate out of its indicating position when said pawl has been actuated by said manually depressible stem, a spring influenced holding pawl pivotally supported with said casing and normally held out of engagement with said ratchet by said manually depressible stem and engaging said ratchet to prevent an operation of said film advancing means when said depressible stem is depressed, and means for preventing a return of said manually depressible stem to its initial position and a release of said holding pawl from said ratchet when said depressible stem is insufficiently depressed to cause a release of the shutter.

5. In a rollfilm camera, the combination of a camera casing having slidably mounted thereon a manually depressible shutter release stem, a manually rotatable film advancing means provided with a ratchet, a friction clutch means and a cam disc adapted to be driven by said clutch means, a rotatably mounted indicator carrying plate having a pawl rotatably supported thereon, means for urging said pawl in engagement with said cam disc, whereby said indicator carrying plate is adapted to be rotated by said cam disc when the latter is rotated and thus moves into a position which indicates that an unexposed film section has been advanced to exposure position, said pawl being moved out of engagement with said cam disc by said manually depressible shutter release stem when the latter is depressed; spring means for moving said carrying plate out of its indicating position when said pawl has been moved out of engagement with said cam disc, a spring influenced holding pawl normally held out of engagement with said ratchet by said manually depressible stem and engaging said ratchet to prevent an operation of said film advancing means when said depressible stem is depressed, and means for preventing a return of said manually depressible stem to its initial position and a release of said holding pawl from said ratchet when said depressible stem is insufficiently depressed to cause a release of the shutter.

HEINZ KÜPPENBENDER.
HEINRICH EYTH.
EUGEN JÖRG.